United States Patent [19]

Pratt

[11] Patent Number: 4,457,652
[45] Date of Patent: Jul. 3, 1984

[54] COMPOSITE BUCKLING BLIND FASTENER

[76] Inventor: John D. Pratt, Rancho Cucamonga, Calif.

[21] Appl. No.: 253,783

[22] Filed: Apr. 13, 1981

[51] Int. Cl.³ .............................................. F16B 19/10
[52] U.S. Cl. ....................................... 411/38; 411/34; 29/523
[58] Field of Search ...................... 411/33, 34, 37–41, 411/43, 55, 70, 54, 198, 201, 301–303, 900, 901, 907, 908; 29/523, 522 A

[56] References Cited

U.S. PATENT DOCUMENTS 4,142,439  3/1979  Landt ..................................... 411/34
4,203,346  5/1980  Hall et al. ............................. 411/34
4,237,768  12/1980  Volkmann ............................. 411/54
4,312,613  1/1982  Binns ..................................... 411/34

Primary Examiner—Thomas F. Callaghan
Assistant Examiner—Neill Wilson

[57] ABSTRACT

In a blind fastener comprising a nut with an axial bore therethrough, a bolt extending through said nut and a sleeve on said bolt, the improvement comprising said sleeve having a thin wall section adjacent to the nut formed by a recess in said section and a collar between said nut and sleeve which has a tensile strength very much less than the tensile strength of said sleeve and the sleeve is adapted upon setting of the fastener to have the thin wall section buckle outwardly upon the contact with the parts being fastened to form a large bearing surface.

9 Claims, 15 Drawing Figures

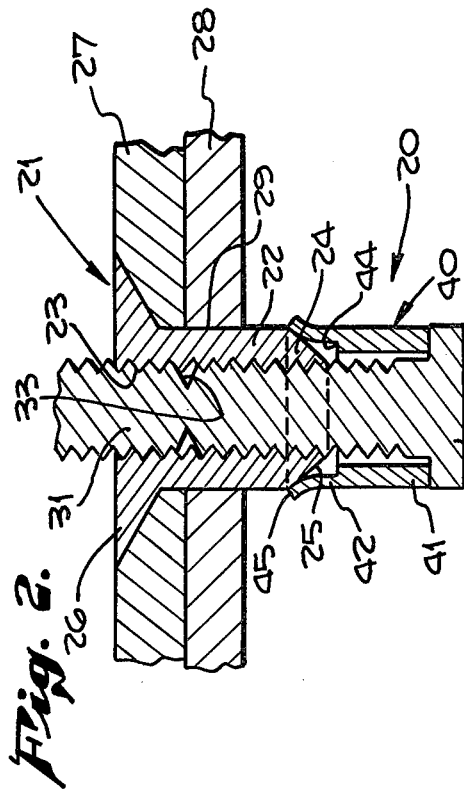
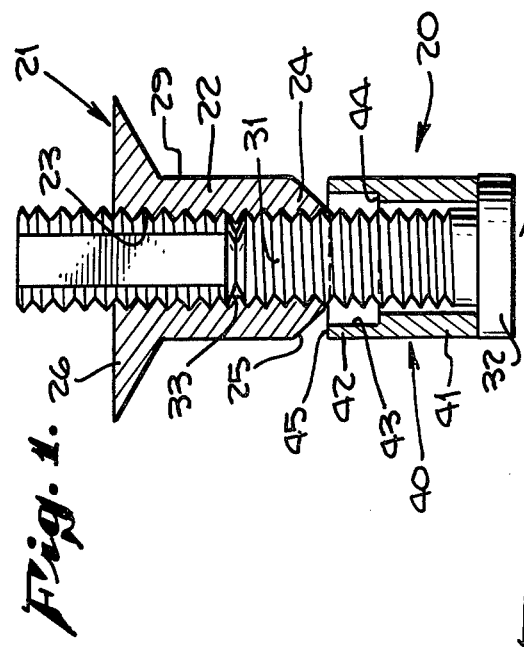
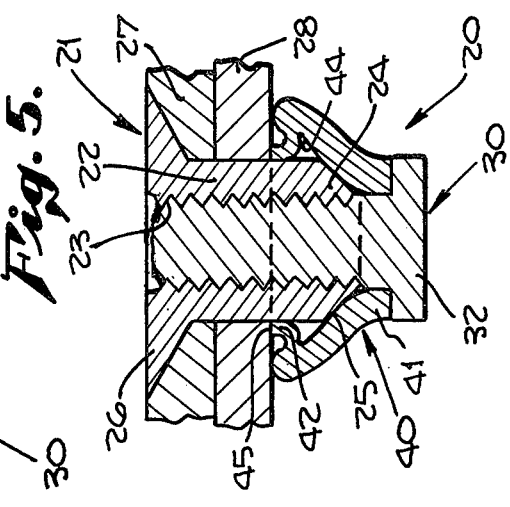
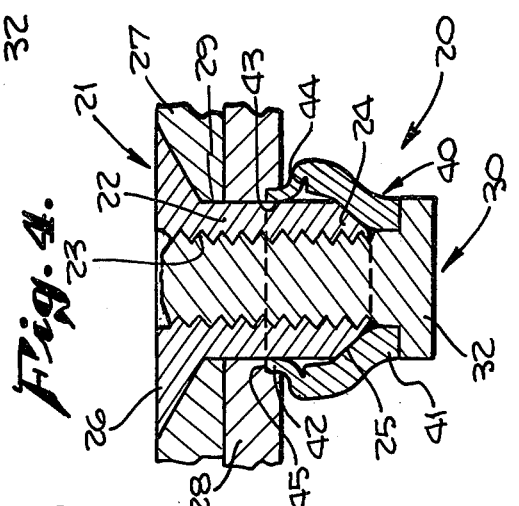
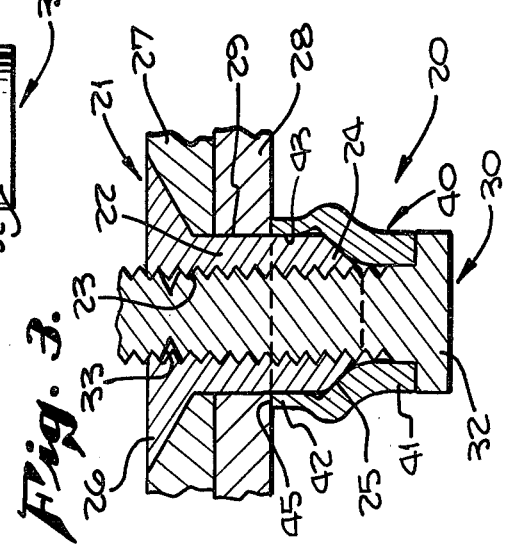

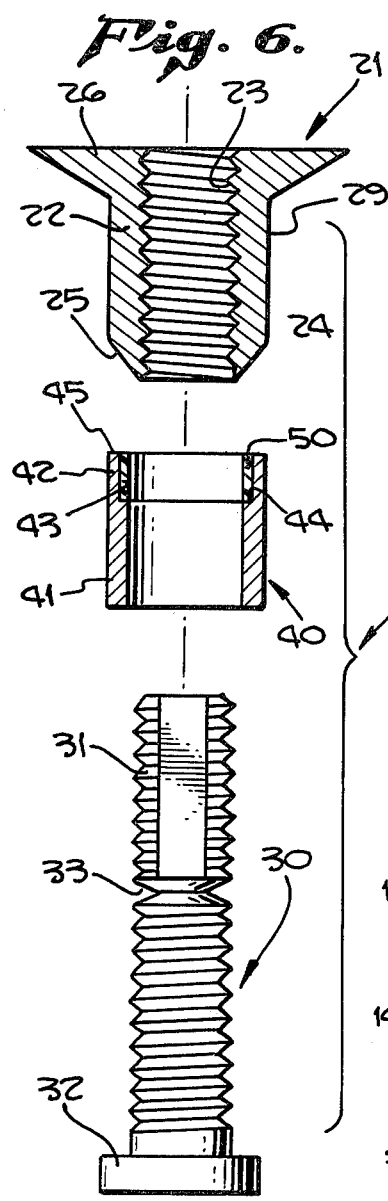

COMPOSITE BUCKLING BLIND FASTENER

BACKGROUND OF THE INVENTION

This invention relates to blind fasteners and more particularly to blind fasteners having a large bearing surface on the blind side of the structure on which it is mounted.

As discussed in the co-pending patent application by Cu Soc Huynh and John D. Pratt entitled "COMPOSITE BLIND FASTENER" Ser. No. 229,323 filed Jan. 29, 1981 and assigned to the same assignee as this patent application, three piece blind fasteners have been known and used for many years wherein the three pieces consist of a nut threaded onto a bolt and an expansible sleeve is located therebetween. As discussed in said co-pending patent application, prior three piece blind fasteners were found to encounter significant problems when utilized with sheets of material which are relatively soft or material such as a graphite composite or when utilized in structures in which very thin sheets of material are utilized on the blind side because the force applied by the sleeve on the blind side surface would be sufficiently high to deform the blind side surface and weaken the sheet at that point. Consequently the patents described in said co-pending patent application and the invention described in said co-pending patent application were developed to achieve a large bearing surface on the blind side so that such materials could be properly fastened with minimal damage to the blind side. However, each of such aforementioned prior inventions has a number of disadvantages associated therewith which the present invention overcomes. For example, the fastener of U.S. Pat. No. 4,203,346 to Hall et al. and in the aforementioned co-pending patent application produce a relatively small bearing surface on the blind side particularly compared to the length of sleeve employed. Further the fact that Hall et al. rely upon the shoulder 27 of the nut 10 to bend the sleeve radially outward against the back surface creates a tendency to delaminate the back surface adjoining the nut 10 at shoulder 27. Moreover, the internal taper of the sleeve bore in Hall et al. increases its cost to manufacture. On the other hand the fastener described in Wilson U.S. Pat. No. 4,033,222 has different disadvantages because due to its design it has relatively high blind side protrusion which limits its use to areas with sufficient clearance on the blind side. Further, because of its number of parts it is relatively heavier and more expensive than the simple three piece blind fastener.

In response to such disadvantages, an object of the present invention is a blind fastener which can achieve a large bearing surface on the blind side with an installed collar although the collar described below can be a separate piece if desired.

Another object of the present invention is a blind fastener which achieves such large bearing area with a single folded sleeve and without relying on a nut shoulder to apply the compressive supporting force on the sleeve.

Still another object of the present invention is a blind fastener which has low blind side protrusion, light weight and low cost but still provides a large uniform bearing surface on the blind side.

Still another object of the present invention is a blind fastener with a sleeve adapted to buckle to permit flush breakoff of the fastener bolt stem throughout the fastener grip range.

Other objects and advantages of the present invention will be readily apparent from the following description and drawings which illustrate a preferred exemplary embodiment of the present invention.

SUMMARY OF THE INVENTION

In general, the present invention involves a blind fastener comprising a nut with an axial bore therethrough and with a conically shaped nose at one end and an enlarged head at the other end. Extending through said nut is a bolt having a stem and having an enlarged head adjacent to said nut nose. Between said nut nose and said bolt head is a sleeve on said bolt stem. The improvement of the present invention comprises said sleeve having a thick wall section adjacent to said bolt head and a thin wall section adjacent to said nut nose formed by a recess in said section. On said bolt stem between said nut nose and said sleeve is a collar having a tensile strength very much less than the tensile strength of said sleeve. Said sleeve is adapted upon the setting of said fastener to initially expand its thin wall section over said nut with said collar therebetween, then to have the free end of the thin wall section taper inwardly toward said nut and then to have the thin wall section buckle outwardly upon contact with the blind surface of the parts being fastened to form a large bearing surface.

In order to facilitate understanding of the present invention, reference will now be made to the appended drawings of a preferred specific embodiment of the present invention. Such drawings, like the preceding summary, should not be construed as limiting the present invention which is properly set forth in the appended claims.

DESCRIPTION OF DRAWINGS

FIG. 1 is an axial cross section of an assembled fastener similar to the assembled fastener of the present invention prior to installation except that the collar element is missing.

FIG. 2 is the fastener of FIG. 1 except that the initial portion of the installation process has taken place.

FIG. 3 is the fastener of FIG. 1 except that it shows the intermediate portion of the installation process.

FIG. 4 is the fastener of FIG. 1 except that it shows one likely configuration of the finally installed fastener.

FIG. 5 is the same as FIG. 4 except that it shows another likely configuration of the finally installed fastener.

FIG. 6 is an exploded view of the fastener of the present invention.

FIG. 11 is an axial cross sectional view of another embodiment of the assembled fastener of the present invention after final installation.

FIG. 12 is an axial cross section of another embodiment of the sleeve and collar portion of the fastener of the present invention.

FIG. 13 is an axial cross section of still another embodiment of the sleeve and collar portion of the fastener of the present invention.

FIG. 14 is an axial cross section of still another embodiment of the sleeve and collar portion of the fastener of the present invention.

FIG. 15 is an axial cross section of the finally installed fastener of the present invention incorporating the embodiment of the sleeve and collar shown in FIG. 14.

DESCRIPTION OF THE PREFERRED EMBODIMENT OF THE PRESENT INVENTION

Figure 7:
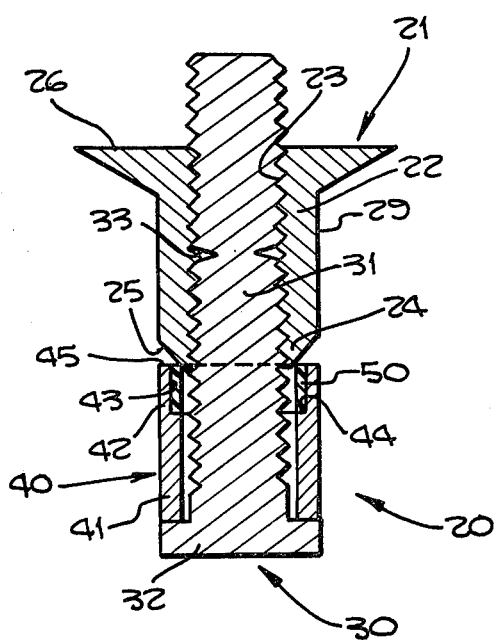
FIG. 7 is an axial cross sectional view of the assembled fastener of the present invention prior to installation.

Before describing the preferred embodiment of the present invention shown in FIGS. 6 through 10, it is desirable first to describe the construction and operation of the very similar fastener shown in FIGS. 1 through 5 in order that the construction and operation of the present invention can be properly understood. The blind fastener shown in FIGS. 1-5 is the same as the fastener of the present invention shown in FIGS. 6-10 except that the collar (described below) is missing and such missing element not only results in a major change in the construction of the blind fastener but also causes a major change in its operation particularly during installation to achieve a large bearing surface on the blind side without damage to the blind side. It should be noted that a blind fastener similar to that shown in FIGS. 1-5 has been proposed in the past but to the best of applicant's knowledge has been abandoned because of the problems discussed below. As illustrated in FIG. 1, the blind fastener 20 comprises a nut 21, a bolt 30 and a sleeve 40. The nut 21 has a body 22 with an axial bore 23 therethrough. The mean diameter (when threaded) of the bore 23 is about 55% to 70% of the external diameter of the body 22. At one end of the nut 21 is a nose 24 bearing a conically shaped chamfer 25 at an angle of about 15° to 30° to the axis of the nut 21. At the other end of the nut 21 is an enlarged head 26 adapted to seat against the open side of the parts 27 and 28 being fastened. The length of the nut 21 is adapted to extend the external surface 29 of the body 22 beyond the blind side of the parts being fastened even in the maximum grip situation by a distance sufficient to permit the thin wall section 42 of the sleeve 40 to adapt to the external surface 29 of a nut body 22. As described below such adaptation differs substantially depending on whether or not the collar 50 is present.

The bolt 30 has a stem 31 extending through the nut 21 and an enlarged head 32 adjacent to the nut nose 24. The diameter of the head 32 is customarily equal to the diameter of the nut body 22. In the stem 31 of the bolt 30 is a breackneck 33 to adapted to fracture when a preselected stress is applied to the bolt stem 31 during installation of the blind fastener 20. Such fracture is designed to occur when the breakneck is located flush with or slightly above the open side of the parts being fastened by the blind fastener upon completion of the installation of the blind fastener.

On the bolt stem 31 between the nut nose 24 and the bolt head 32 is a sleeve 40 having a thick wall section 41 adjacent to the bolt head 32 and a thin wall section 42 adjacent to the nut nose 24 formed by a recess 43 in said thin wall section 42. The length of the thin wall section 42 of the sleeve 40 is about 20% to 50% of the length of the sleeve 40 and preferably is about 30% to 45% of the length of the sleeve 40. The wall thickness of the thin wall section 42 of the sleeve 40 is about 5% to 20% of the outside diameter of the sleeve 40. The thickness of the thin wall section 42 is about 50% to 70% of the thickness of the thick wall section 41. Between the thick wall section 41 and thin wall section 42 is a shoulder 44. The external diameter of the sleeve 40 is customarily equal to the diameter of the nut body 22.

The operation during installation of the fastener shown in FIG. 1 is illustrated in FIGS. 2-5. As illustrated in FIG. 2, as the bolt 30 is drawn into the nut 21, the free end 45 of the thin wall section 42 contacts the chamfer 25 of the nut nose 24 and is expanded outwardly thereby. As illustrated in FIG. 3, upon further drawing of the bolt 30 into the nut 21, the thin wall section 42 of the sleeve 40 progresses along the body 22 of the nut 21 and conforms to the external surface 29 of the body 22 so that the thin wall section 42 in effect becomes a hollow cylindrical column co-axial with the body 22 of the nut 21. Consequently, when the free end 45 of the thin wall section 42 contacts the blind side of part 28 frequently the situations illustrated in FIG. 4 or 5 occur rather than the desired situation illustrated in FIG. 10 below in connection with the present invention. As illustrated in FIG. 4, particularly with soft materials such as a graphite composite, the free end 45 digs into the part 28 and damages it. Further, while there is some resulting buckling as illustrated in FIG. 4, the resulting bearing surface is not much larger than the diameter of the nut 21. As illustrated in FIG. 5, another frequent occurence where the force required to buckle the thin wall section 42 is sufficiently low so that the free end 45 does not dig too deeply into the blind surface of the part 28, such buckling occurs at some intermediate portion of the thin wall section 42 so that such thin wall section loops over. The resulting configuration as illustrated in FIG. 5 results in again a relatively small diameter of bearing surface of a blind side of part 28 and a substantial portion of the possible bearing area is not in contact with the thin wall section 42 of the sleeve 40. Such result again is a marked contrast with the result obtained as illustrated in FIG. 10 with the present invention.

Having described the construction and operation of a fastener the same as the present invention except for the missing collar 50 and illustrating the problems arising therefrom, the construction and operation of the preferred embodiment of the present invention as shown in FIGS. 6-10 will now be described illustrating the advantages resulting therefrom. As shown in FIG. 7, the blind fastener of the present invention is the same as the blind fastener shown and described in FIG. 1 except that it includes a collar 50 on the bolt stem 31 between the nut nose 24 and sleeve 40 which collar 50 has a tensile strength very much less than the tensile strength of the sleeve 40. The sleeve 40 is adapted upon the setting of the blind fastener 20 to initially expand its thin wall section 42 over the nut 21 with the collar 50 therebetween. Then the free end 45 of the thin wall section 42 tapers inwardly toward the nut body 22. Finally the thin wall section 42 buckles outwardly upon contact with the part 28 to form a large bearing surface on the blind side of part 28. As shown in FIG. 7, the collar 50 is initially set in the thin wall recess 43 and is the same length as the thin wall recess 43; however, depending on the relative tensile strength of the collar 50 and the sleeve 40 the length of the collar 50 may be between about 50% and 100% of the length of the thin wall recess 43. The tensile strength of the collar material can be about 5% to 30% of the tensile strength of the sleeve material but is preferably about 10% to 20% of the tensile strength of the sleeve material.

Figure 8:
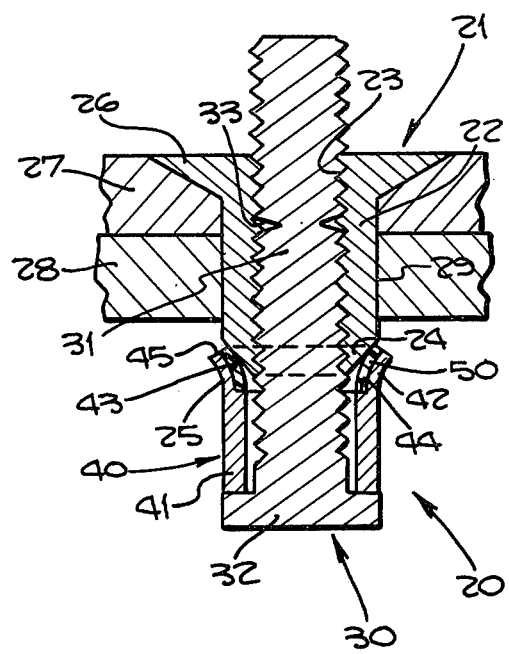
FIG. 8 is the fastener of FIG. 7 except that it shows the initial portion of the installation process of the fastener of the present invention.
Figure 9:
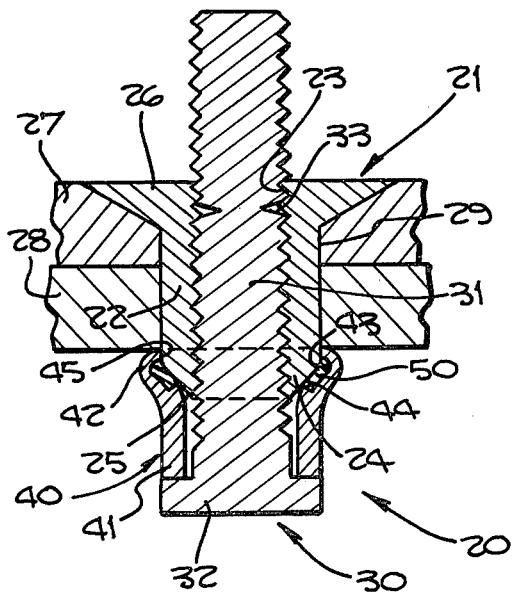
FIG. 9 is the fastener of FIG. 7 except that it shows the intermediate portion of the installation process of the fastener of the present invention.
Figure 10:
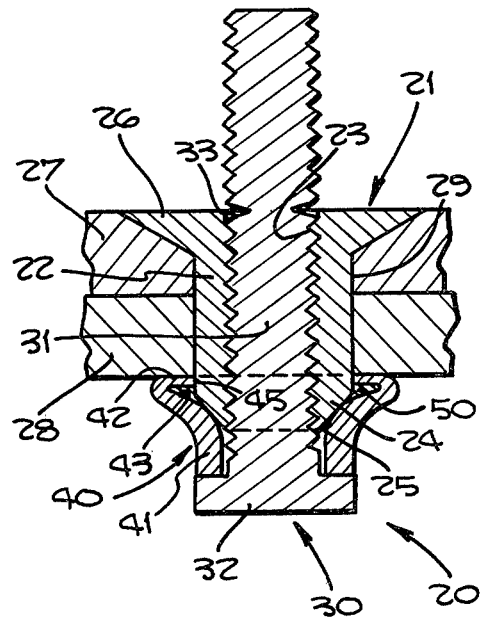
FIG. 10 is the fastener of FIG. 7 except it shows the configuration of the finally installed fastener of the present invention.

The operation of the blind fastener 20 of the present invention is illustrated in FIGS. 8-10. As shown in FIG. 8, (similar to FIG. 2) as the bolt 30 is drawn into the nut 21 the collar 50 adjoining the free end 45 of the thin wall section 42 contacts the chamfer 25 of the nut nose 24 and causes the free end 45 to expand outwardly. As illustrated in FIG. 9, (unlike FIG. 3) upon the bolt 30 continuing to be drawn into the nut 21, the collar 50 and thin wall section 42 proceed over the body 22 of the nut 21, however, because of the stress applied by the high tensile strength thin wall section 42 to the low tensile strength collar 50, the free end 45 of the thin wall section 42 tapers inwardly toward the external surface 29 of the body 22 displacing a portion of the collar 50 but does not become aligned with the body 22. Consequently, unlike the situation shown in FIG. 3, the thin wall section 42 does not conform to the external surface 29 of the body 22 but rather assumes a buckling mode which curves substantially at the free end 45 adjacent to the blind side of the part 28. Consequently, as shown in FIG. 10, upon contact with the blind side of the part 28, the thin wall section 42 buckles outwardly without substantial pressure being applied by the free end 45 to the blind side of the part 28 and with a uniform large bearing surface approximately circular in shape and having a diameter of about 150% to 200% of the external diameter of the nut body 22.

As shown in FIG. 11, an alternate embodiment of the present invention includes an unthreaded nut and bolt with the bolt stem 31a having a groove section 34 adjoining the end 35 remote from the bolt head 32a which groove section is adapted to be grasped by an installation tool (not shown) and the bolt thereby pulled into the nut during installation in a manner well known to the prior art. Such alternate embodiment of the fastener of the present invention preferably includes a locking ring 36 on the bolt stem, which upon installation seats in a locking groove 37 in the bolt stem 31a and in a recess 38 in the nut head 26 such as those described in U.S. Pat. No. 4,246,828 to Tamashiro (also assigned to the assignee of this application) to lock the bolt to the nut on the open side of the part 27. Otherwise as shown in FIG. 11, such alternate embodiment achieves the same results as the blind fastener shown in FIG. 10.

As shown in FIG. 12, the sleeve 140 and the collar 150 may be separate elements mounted in the same relative positions on the bolt stem 31. Further, the free end 146 of the thick wall section 141 has a chamfer 147 at an angle of about 20° to 30° from the axis of the sleeve 140 to minimize the tuck out of the sleeve 140 when forced into contact with the bolt head. Still other embodiments of the nut and sleeve of the present invention are shown in FIGS. 13 and 14 where adjacent the free ends 246 and 346, respectively, of the thick wall sections 241 and 341, respectively, are reduced wall sections 248 and 348, respectively. The reduced wall section 248 is formed by a groove 249 in the exterior surface of the thick wall section 241 of the sleeve 240. On the other hand, the reduced wall section 348 in sleeve 340 is formed by a recess 349 in the free end 346 of thick wall section 341. In either case, the length of the reduced wall sections 248 and 348, respectively, are about 20% to 50% of sleeves 240 and 340, respectively, and preferably are about 30% to 45% of the length of the respective sleeves 240 and 340. The wall thickness of the reduced wall sections 248 and 348 of the respective sleeves 240 and 340 are each about 10% to 30% of the outside diameter of the respective sleeves 240 and 340. As illustrated in FIG. 13, the reduced wall section need not be adjoining the free end.

As illustrated in FIG. 15, the alternate embodiment of the present invention such as those illustrated in FIGS. 13 and 14 involve the free end of the thick wall section of the sleeve being adapted to buckle to permit flush breakoff of the bolt stem throughout the fastener grip range. As illustrated in FIGS. 13 and 14 such selective buckling may be achieved by a reduced wall section either by a groove in the external surface or a recess in the sleeve bore. As illustrated in FIG. 15 such selective buckling permits the uniform large bearing surface on the blind side of the part 328 and in addition, permits additional buckling adjacent to the bolt head for a portion of the sleeve 340 to accommodate unequal thicknesses on the blind side of the parts being fastened.

Still other embodiments of the present invention may include selectively annealing the thin wall section of the sleeve to reduce further its tensile strength to permit buckling at a desired level of applied force. Similarly, the thick wall section may be selectively annealed with or without a reduced wall portion to reduce its tensile strength to provoke buckling to permit flush breakoff throughout the fastener grip range.

The major dimensions (in inches) of a specific example (MBF2013-6-100 130° flush shear head) of the blind fastener of the present invention are as follows:

finished nut:
    head diameter minimum—0.342
    nut tap size—60-40NS-2B
    nut body diameter
        maximum—0.1980
        minimum—0.1975
    nut length (including head and nose)—0.217
finished bolt:
    head diameter
        maximum—0.1965
        minimum—0.1940
    stem diameter—60-40NS-2A
    bolt length (including head)
        maximum—0.916
        minimum—0.906
sleeve:
    total length
        maximum—0.350
        minimum—0.345
    thin wall section length—0.125±0.002
    external diameter
        maximum—0.1965
        minimum—0.1960
    thin wall section (internal diameter)
        maximum—0.167
        minimum—0.165
    thick wall section (internal diameter)
        maximum—0.141
        minimum—0.139
collar:
    length
        maximum—0.131
        minimum—0.123
    external diameter
        maximum—0.166
        minimum—0.164
    internal diameter maximum—0.141
minimum—0.139
buckled thin wall section diameter minimum—0.300

The materials utilized in the blind fastener of the present invention, of course, vary depending upon the application for which such blind fastener is intended. However, as a specific example, the nut may be made of Ti-6Al-4V titanium alloy or A-286 stainless steel. The nut may utilize a variety of head styles such as the flush head defined in AN 509, MS 20426, NAS 1097 or a protuding head with driving recess as defined in NAS 1669. The bolt made may be made out of the same materials as the nut. The sleeve may be made out of materials such as A-286 or 304 stainless steel. The collar is preferably made out of low tensile strength plastic materials such as Delrin, Celcon, Teflon, Nylon or fiberglass reinforced versions of the above; however, softened metal such as aluminum, copper and nickel may be utilized provided that the tensile strength of the sleeve is sufficiently larger than the tensile strength of the collar as discussed above. A specific example of a set of materials is that the nut, bolt and sleeve are composed of A-286 stainless steel (tensile strength of nut and bolt approximately 180 KSI and tensile strength of sleeve approximately 75 KSI) and the collar composed of Delrin acetal rod (tensile strength 8 to 12 KSI).

There are many features in the present invention which clearly shown the significant advance which the present invention achieves over the prior art. Consequently, only a few of the more outstanding features will be pointed out to illustrate the unexpected and unusual results obtained by the present invention. One feature of the present invention is a blind fastener which can have an installed collar but achieves a large uniform bearing surface on the blind side without substantially damaging the blind side. Still another feature of the present invention is a blind fastener which achieves a large bearing surface on the blind side but is less expensive, lighter, easier to fabricate, and has shorter blind side protrusion than comparable large bearing surface blind fasteners. Still another feature of the present invention is a blind fastener which has a combination of a sleeve with a thin wall section adjacent to the nut on the blind side and a collar adjoining such thin wall section which collar has a tensile strength very much less than the tensile strength of said sleeve so that upon installation the free end of the thin wall section tapers inwardly toward said nut and the thin wall section buckles easily upon contact with the surface on the blind side. Still another feature of the present invention is a blind fastener wherein the free end of the thick wall section of the sleeve is adpated to buckle to permit the flush breakoff throughout the fastener grip range.

It will be understood that the foregoing description and drawings are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

What is claimed is:

1. In a blind fastener comprising (a) a nut with an axial bore therethrough and with a nose at one end and an enlarged head at the other end, (b) a bolt having a stem extending through said nut and having an enlarged head adjacent to said nut nose, and (c) a sleeve on said bolt stem between said nut nose and said bolt head, the improvement which comprises said sleeve having a thick wall section adjacent to said bolt head and a thin wall section adjacent to said nut nose formed by a recess in said section and a collar on said bolt stem between said nut nose and said sleeve which collar has a tensile strength very much less than the tensile strength of said sleeve, said sleeve being adapted upon the setting of said fastener to initially expand its thin wall section over said nut with said collar therebetween, then to have the free end of the thin wall section tapered inwardly toward said nut, and then to have the thin wall section buckle outwardly upon contact with the parts being fastened to form a large bearing surface.

2. A blind fastener as stated in claim 1 wherein said collar is initially set in said thin wall recess.

3. A blind fastener as stated in claim 1 wherein the length of the thin wall section of said sleeve is about 20% to 50% of the length of said sleeve.

4. A blind fastener as stated in claim 1 wherein the length of the thin wall section of said sleeve is about 30% to 45% of the length of said sleeve.

5. A blind fastener as stated in claim 1 wherein the wall thickness of the thin wall section of said sleeve is about 5% to 20% of the outside diameter of said sleeve.

6. A blind fastener as stated in claim 1 wherein the tensile strength of the collar material is about 5% to 30% of the tensile strength of the sleeve material.

7. A blind fastener as stated in claim 1 wherein the tensile strength of the collar material is about 10% to 20% of the tensile strength of the sleeve material.

8. A blind fastener as stated in claim 1 wherein the length of said collar is between about 50% and 100% of the length of said thin wall recess.

9. A blind fastener as stated in claim 1 wherein the free end of the thick wall section of said sleeve is adapted to buckle to permit flush breakoff of said bolt stem throughout the fastener grip range.

* * * * *